INVENTORS.
MILES J. McGOFF
JOHN W. MAUSTELLER
JOHN C. KING

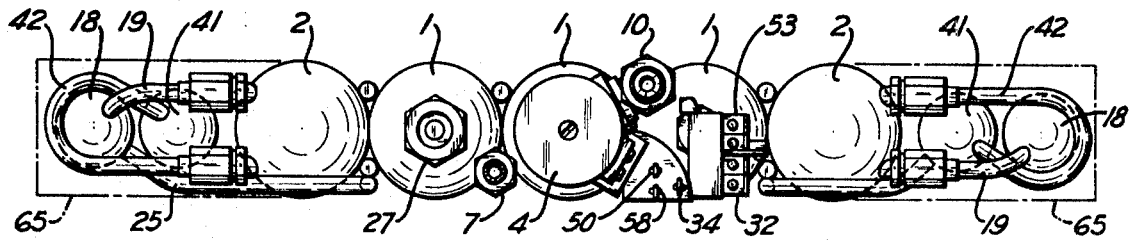
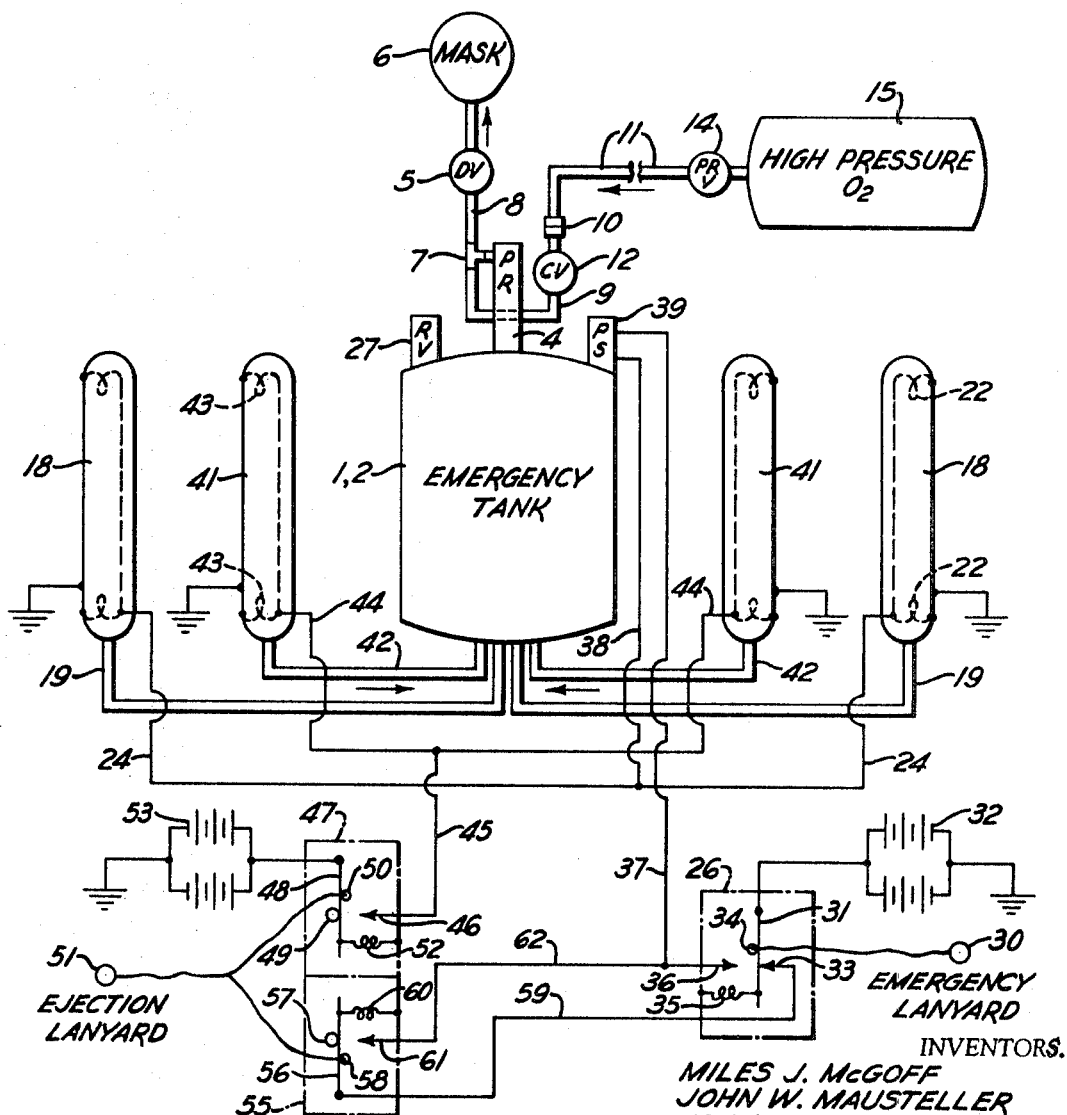

3,591,343
EMERGENCY OXYGEN APPARATUS

Miles J. McGoff, Warrendale, John W. Mausteller, Evans City, and John C. King, Mars, Pa., assignors to Mine Safety Appliances Company, Pittsburgh, Pa.
Filed Oct. 29, 1968, Ser. No. 771,578
Int. Cl. B01j 7/00; C01b 13/08
U.S. Cl. 23—281                                                11 Claims

ABSTRACT OF THE DISCLOSURE

Connected with the outlet of an oxygen storage tank is a pressure reducer valve that has an outlet for connection with the demand valve of a breathing mask. For charging the tank with oxygen from a primary oxygen supply system, there is a conduit provided with a check valve permitting flow only toward the tank. An oxygen producing candle is in a receptacle connected by a conduit with the tank, and manually operable means is provided for igniting the candle to generate additional oxygen for the tank. Another candle receptacle also is connected with the tank, and there are means for igniting it followed by automatic ignition of the other candle.

---

Figure 1:
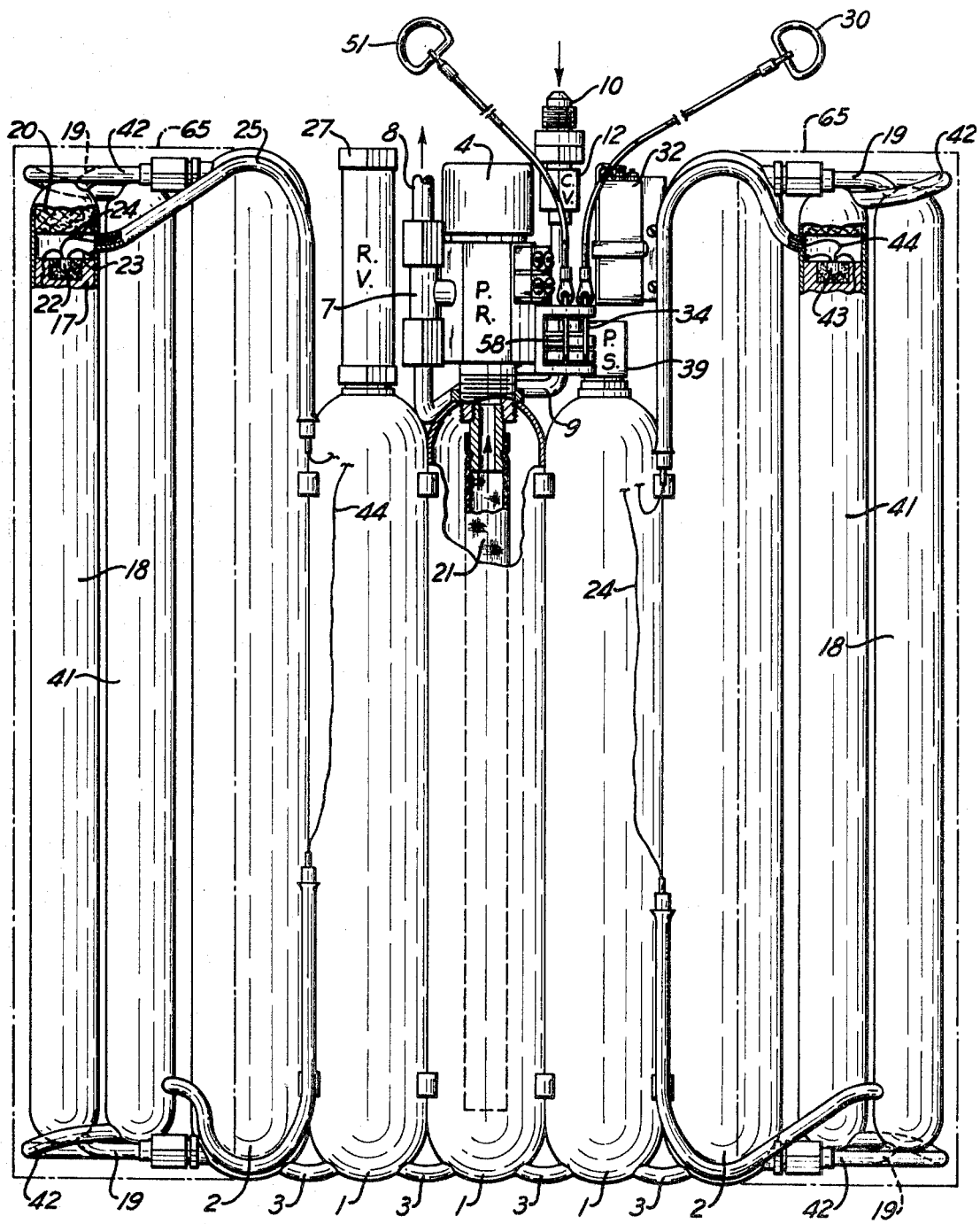

The invention herein described was made in the course of or under a contract or subcontract thereunder with the Department of the Navy.

Military aircraft are equipped with emergency oxygen supply packs that store oxygen at high pressures, such as around 1800 p.s.i.g. These packs are confined to small spaces and have limited oxygen capacity because of the space and pressure available from commercial oxygen bottles. It requires maintenance to keep the packs fully pressurized in order to maintain sufficient oxygen supply. With the increase in operational altitude from 40,000 feet to 70,000 feet, a larger oxygen capacity is needed, especially when an airman finds it necessary to bail out at 70,000 feet. The present systems are satisfactory only for a maximum bail out height of about 40,000 feet.

It is among the objects of this invention to provide emergency oxygen apparatus which has a larger capacity than known apparatus of about the same size, which requires substantially no maintenance, which can be activated after years of storage, and which can be operated in conjunction with a primary oxygen supply system.

The preferred embodiment of the invention is illustrated in the accompanying drawings, in which:

FIG. 1 is a side view, with parts broken away, of our apparatus;
FIG. 2 is a plan view thereof; and
FIG. 3 is a diagram of the system.

Referring to FIGS. 1 and 2 of the drawings, an emergency storage tank is provided that preferably is formed from several high pressure cylinders so that the thickness of the apparatus as a whole can be limited to only a few inches. To obtain the desired tank capacity, five cylinders are shown in the drawings, but the number depends on their length and diameter. Three of these cylinders 1 are shorter than the two end cylinders 2 of the group to provide a space in which the various valves and control elements can be disposed. The lower ends of all of these cylinders are connected by short tubes 3 so that they form, in effect, a single tank and they often will be referred to herein that way.

One of the cylinders, such as the middle one, has an outlet in its upper end, to which is connected a pressure reducer valve 4. The outlet of this valve is designed to be connected with the demand valve 5 of a breathing mask 6, such as indicated in FIG. 3. To help simplify the construction, it is preferred to connect a T-coupling 7 to the outlet of the pressure reducer valve. The upper end of this coupling is adapted to be connected by a tube 8 to the demand valve just mentioned. The lower end of the coupling is connected to a tube 9 that is provided at its opposite end, which is its inlet, with a quick disconnect coupling 10 of conventional form, by which this tube can be quickly connected to and disconnected from the conduit 11 of the primary oxygen supply system of the aircraft in which this apparatus is intended to be used, as shown in FIG. 3. This tube contains a check valve 12 that allows flow of oxygen through the tube only toward the T-coupling, so oxygen cannot escape through the tube when it is disconnected from the primary system.

The pressure reducer valve 4 is set to open when the oxygen pressure at its outlet is below a predetermined minimum. This minimum generally will be about 80 p.s.i.g. The pressure reducer valve 14 of the primary oxygen supply system is set to supply oxygen from the high pressure oxygen bottle 15 at a lower pressure, such, for example, at 70 p.s.i.g. Consequently, when the emergency tank 1, 2 is first connected with the primary supply by coupling 10, pressure reducer valve 4 will remain open and oxygen from bottle 15 will flow backward through that valve to fill the tank with oxygen at a pressure of about 70 p.s.i.g. As long as normal conditions prevail, the person wearing the mask will obtain oxygen from the primary system through the T-coupling and tube 9. If desired, oxygen could be delivered to the tank from the primary system without going through valve 4 if tube 9 were connected directly to the tank or if it were provided with a branch going directly to the tank and containing another check valve, but these modifications would require an extra inlet in the tank and, in the one case, an extra check valve.

A feature of this invention is that if the primary oxygen system should fail during flight, oxygen can be drawn from the emergency tank while the tank is kept filled with oxygen from another source. This other source of oxygen is a solid state chemical system, in which sodium chlorate candles liberate oxygen by thermal decomposition. For the emergency just mentioned, two candles are used for best results. As shown in FIG. 1, the candles 17 are housed in tubular pressure receptacles 18, the opposite ends of which are connected by outlet tubes 19 to the nearest pressure cylinders 2. The ends of each candle are spaced from the ends of its receptacle, and filtering material 20 is disposed between the candle and the outlet tubes. Another filter 21 may be located in center cylinder 1 and be connected to its outlet. An electric igniter 22 is embedded in both ends of each candle in order to light each candle at both ends simultaneously and thereby generate oxygen faster. The igniters are grounded by wires 23 to the surrounding receptacle and are connected by another wire 24, extending out of the receptacle through a sealed tube 25, to an electric switch 26.

When these two candles are ignited, the oxygen they produce flows through tubes 19 into the emergency tank cylinders and maintains the desired pressure therein until the candles are consumed. To avoid accident in case the pressure in the tank builds up too high, one of the cylinders may be provided with a pressure relief valve 27 to open before a dangerous pressure is reached. The pressure reducer valve 4 will close whenever the pressure between its outlet and demand valve 5 rises above 80 p.s.i.g., but it will open to allow flow of oxygen out of the tank whenever the wearer of the mask inhales and thereby causes the demand valve to open and reduce the pressure at the outlet of the pressure reducer valve below 80 p.s.i.g.

In order to ignite the two candles, a lanyard 30 is pulled to close the switch 26 in the igniter circuit. This switch may take various forms, the one illustrated diagrammatically in FIG. 3 being merely to show how the device operates. The terminal of the movable contact 31 is connected to a pair of batteries 32 and normally is held against a fixed contact 33 by means of a removable pin 34 connected to the lanyard. The circuit normally is not closed, however, because contact 33 is connected with another switch, described later, that normally is open. When the pin is pulled by the lanyard, the movable contact is released and, if not itself a spring contact, is pulled by a spring 35 against a second fixed contact 36 that is connected with wires 24 through wires 37 and 38 and a pressure switch 39 exposed to the pressure in the emergency tank. The pressure switch is held open as long as the pressure in the tank is above a certain level, such as about 55 p.s.i.g. Therefore, if the lanyard is pulled before the pressure drops below that value, so that supplemental oxygen is not needed, the emergency candles 17 will not be ignited. Ordinarily, the user of the appaartus will not feel any desire for additional oxygen unless the pressure in the tank is so low that the pressure switch is closed. Then, when he pulls the lanyard, the candles will be ignited immediately and will feed oxygen into the tank to raise the pressure therein.

Another feature of this invention is that in case an airman has to eject from this plane with this emergency apparatus, so that he will be separated from the primary system and must depend entirely on the emergency apparatus, he not only will have the benefit of oxygen liberated by emergency candles, but also additional oxygen from a further source. This further source likewise takes the form of two candles in receptacles 41 that are connected by tubes 42 to tank cylinders 2. The candles can be ignited by electric igniters 43 connected by wires 44 and 45 to a fixed contact 46 of a second switch 47. The movable contact 48 of this switch normally is held against a stop 49 by a removable pin 50 connected to another lanyard 51. When this pin is pulled by the lanyard, the movable contact springs, or is moved by a spring 52, against the fixed contact to connect a pair of batteries 53 with the igniters to light the ejection candles.

The same lanyard 51 also operates simultaneously a third switch 55, in which the movable contact 56 likewise is held against a stop 57 by a removable pin 58 connected to the lanyard. This contact is connected by a wire 59 with fixed contact 33 of switch 26. At bail out, the airman does not pull emergency lanyard 30, but ejection lanyard 51, and when that is done contact 56 is moved by a spring 60 against a fixed contact 61 connected by a wire 62 to wire 37. This connects pressure switch 39 though wires 37 and 62, switch 55, wire 59 and switch 26 with batteries 32. However, since the ejection candles are delivering oxygen to the emergency tank and thereby maintaining a high pressure in it, the pressure switch will remain open and the emergency candles will not be ignited at that time. Later, if the demand for oxygen continues after the ejection candles are consumed and the pressure in the tank starts to fall below 55 p.s.i.g., the pressure switch will close and connect wire 37 with igniters 21 to automatically prolong the supply of oxygen to the tank for several more minutes.

Therefore, duing bail out, the airman has a continuous supply of oxygen available that will last about twice as long as the supply furnished by the emergency candles alone. If, before ejecting, he had to use the emergency candles 17 he would still have the ejection candles for bail out. On the other hand, if he did not need to bail out but found that he needed supplemental oxygen for a period longer than the emergency candles could supply it, he could pull the lanyard 51 and obtain the benefit of the ejection candles.

Since the burning candles generate considerable heat, the candle receptacles preferably are enclosed in protective jackets 65 of insulation, as indicated in broken lines in FIGS. 1 and 2.

Two sets of batteries, such as shown, are preferred for safety's sake. If for any reason one set failed to ignite the candles connected with it, the other set could be used for igniting the other candles and that might be sufficient for the emergency.

A big advantage of the solid state chemical oxygen source is that it reduces maintenance materially. The candles can be stored for years without requiring any care, and there is no gaseous oxygen that must be maintained under pressure and checked periodically. Topping off of high pressure oxygen is eliminated.

We claim:

1. Emergency oxygen apparatus for use with a primary oxygen supply system, comprising a storage tank provided with an outlet, a pressure reducer valve connected with said outlet and having an outlet for connection with the demand valve of a breathing mask, a conduit connected to said tank and adapted to be connected with a primary system for delivering oxygen under pressure therefrom to said tank, a check valve in the conduit permitting flow only toward the tank, an oxygen producing candle, a receptacle containing the candle, a conduit connecting the receptacle with said tank, and manually operable means for igniting the candle to produce oxygen for the tank.

2. Emergency oxygen apparatus according to claim 1, including a quick-disconnect coupling for the inlet of said first-mentioned conduit.

3. Emergency oxygen apparatus according to claim 1, including a second oxygen producing candle, a receptacle containing that candle, a conduit connecting the second receptacle to the tank, an electric ignition circuit connected with the second candle, a normally closed pressure switch in the circuit responsive to the oxygen pressure in said tank, the switch being formed to be maintained open by the tank pressure as long as that pressure remains above a predetermined minimum, and a normally open main switch in said circuit in series with said pressure switch, said manually operable means including an electric ignition circuit connected with the first-mentioned candle, a normally open switch in said last-mentioned circuit, and means for closing said main switches substantially at the same time.

4. Emergency oxygen apparatus according to claim 1, in which said first-mentioned conduit is connected with said pressure reducer valve outlet to deliver oxygen to the tank through that valve, and the pressure reducer valve normally is open but closes when the pressure at its outlet rises above a predetermined value.

5. Emergency oxygen apparatus according to claim 4, including a T-coupling having one of its three ports connected with the outlet of the pressure reducer valve, another of its ports connected with said first-mentioned conduit, and its remaining port adapted to be connected with the demand valve of a breathing mask.

6. Emergency oxygen apparatus according to claim 1, including a second oxygen producing candle, a receptacle containing that candle, a conduit connecting the second receptacle with the tank, and means operative after the first candle has been ignited for automatically iginting the second candle when the oxygen pressure in the tank falls below a predetermined minimum.

7. Emergency oxygen apparatus according to claim 6, including manually operable means for igniting the second candle without igniting the other candle.

8. Emergency oxygen apparatus according to claim 6, in which said automatic igniting means include an electric ignition circuit, and a normally closed pressure switch in the circuit responsive to the oxygen pressure in said tank, the switch being formed to be mantaned open by the tank pressure as long as that pressure remains above said predetermined minimum.

9. Emergency oxygen apparatus according to claim 8, including a normally open main switch in said circuit in series with said pressure switch, and manually operable means for closing the main switch to ignite only the second candle.

10. In emergency oxygen apparatus, a storage tank, an oxygen producing candle, a receptacle containing the candle, a conduit connecting the receptacle with the tank, manually operable means for igniting the candle to produce oxygen for the tank, a second oxygen producing candle, a second receptacle containing that candle, a conduit connecting the second receptacle with the tank, an electric ignition circuit for the second candle, a normally closed pressure switch in the circuit responsive to the oxygen pressure in said tank, the switch being formed to be maintained open by the tank pressure as long as that pressure remains above said predetermined minimum, a normally open main switch in said circuit in series with said pressure switch, and manually operable means for closing the main switch before the second candle is ignited, whereby the second candle will be ignited when falling pressure in the tank allows the pressure switch to close.

11. In emergency oxygen apparatus, a storage tank, an oxygen producing candle, a receptacle containing the candle, a conduit connecting the receptacle with the tank, manually operable means for igniting the candle to produce oxygen for the tank, a second oxygen producing candle, a second receptacle containing that candle, a conduit connecting the second receptacle with the tank, an electric ignition circuit for the second candle, a normally closed pressure switch in the circuit responsive to the oxygen pressure in said tank, the switch being formed to be maintained open by the tank pressure as long as that pressure remains above said predetermined minimum, a normally open main switch in said circuit in series with said pressure switch, said manually operable means including an electric ignition circuit connected with the first-mentioned candle, a normally open main switch is said last-mentioned circuit, and means for closing said main switches substantially at the same time, whereby the second candle will be ignited when falling pressure in the tank allows the pressure switch to close.

References Cited

UNITED STATES PATENTS

| | | | |
|---|---|---|---|
| 393,737 | 12/1888 | Arnold | 23—281 |
| 1,160,524 | 11/1915 | Muehl | 23—281 |
| 2,444,029 | 6/1948 | Bowen | 23—221X |
| 2,558,756 | 7/1951 | Jackson et al. | 23—281 |
| 2,758,015 | 8/1956 | Bovard et al. | 23—281 |
| 2,775,511 | 12/1956 | Geffray et al. | 23—281 |
| 3,482,568 | 12/1969 | Bovard | 23—281X |
| 3,385,672 | 5/1968 | McGoff et al. | 23—281 |
| 3,436,191 | 4/1969 | McGoff et al. | 23—281 |
| 3,443,907 | 5/1969 | Mausteller | 23—281 |
| 3,482,568 | 12/1969 | Bovard | 23—281X |

MORRIS O. WOLK, Primary Examiner

B. S. RICHMAN, Assistant Examiner

U.S. Cl. X.R.

128—142.3